(12) United States Patent
Grehant et al.

(10) Patent No.: US 6,298,273 B1
(45) Date of Patent: Oct. 2, 2001

(54) CONTROL DEVICE FOR A SOLAR PROTECTION MEANS

(75) Inventors: Jean-Pierre Bernard Grehant, Nancy sur Cluses; Dominique Jacquel, Cluses, both of (FR)

(73) Assignee: Somfy (FR)

( * ) Notice: Subject to any disclaimer, the term of this patent is extended or adjusted under 35 U.S.C. 154(b) by 0 days.

(21) Appl. No.: 09/186,903

(22) Filed: Nov. 6, 1998

(30) Foreign Application Priority Data

Nov. 21, 1997 (FR) .................................................. 97 14640

(51) Int. Cl.$^7$ ...................................................... G06F 19/00
(52) U.S. Cl. ........................... 700/108; 700/90; 160/168; 126/701
(58) Field of Search ............... 700/90, 108; 395/500–23; 707/103; 702/3; 165/209, 288; 126/701, 603, 572; 160/168

(56) References Cited

U.S. PATENT DOCUMENTS

| | | | |
|---|---|---|---|
| 3,646,985 | * 3/1972 | Klann | 160/168 |
| 4,706,726 | * 11/1987 | Nortoft | 160/168 |
| 4,881,219 | 11/1989 | Jacquel | 700/90 |
| 5,275,219 | * 1/1994 | Giacomel | 160/6 |
| 5,467,808 | * 11/1995 | Bell | 160/168.1 |
| 5,760,558 | * 6/1998 | Popat | 318/480 |

FOREIGN PATENT DOCUMENTS

| | | |
|---|---|---|
| 19517198 | 10/1996 | (DE) . |
| 0426577 | 5/1991 | (EP) . |
| 2510777 | 2/1983 | (FR) . |

OTHER PUBLICATIONS

Search Report France.

* cited by examiner

*Primary Examiner*—William Grant
*Assistant Examiner*—Kidest Bahta
(74) *Attorney, Agent, or Firm*—Robert F. I. Conte; Lee, Mann, Smith, McWilliams, Sweeney & Ohlson

(57) ABSTRACT

The device is meant to move the solar protection means from a first position, among at least two predetermined positions, toward a second position to adapt to a variation in sunshine. It comprises a logic (6) which breaks down movement from the first to the second position into a minimum of two steps separated by a time interval (T1). A command (STOP) activated by a user during said interval (T1) activates the following step and reduces the interval by a fraction. The activation of an order after the interval (T1) and during the operation of the following step increases the interval (T1) by a fraction. The control device is in this way capable of adapting to the behavior of the user.

9 Claims, 1 Drawing Sheet

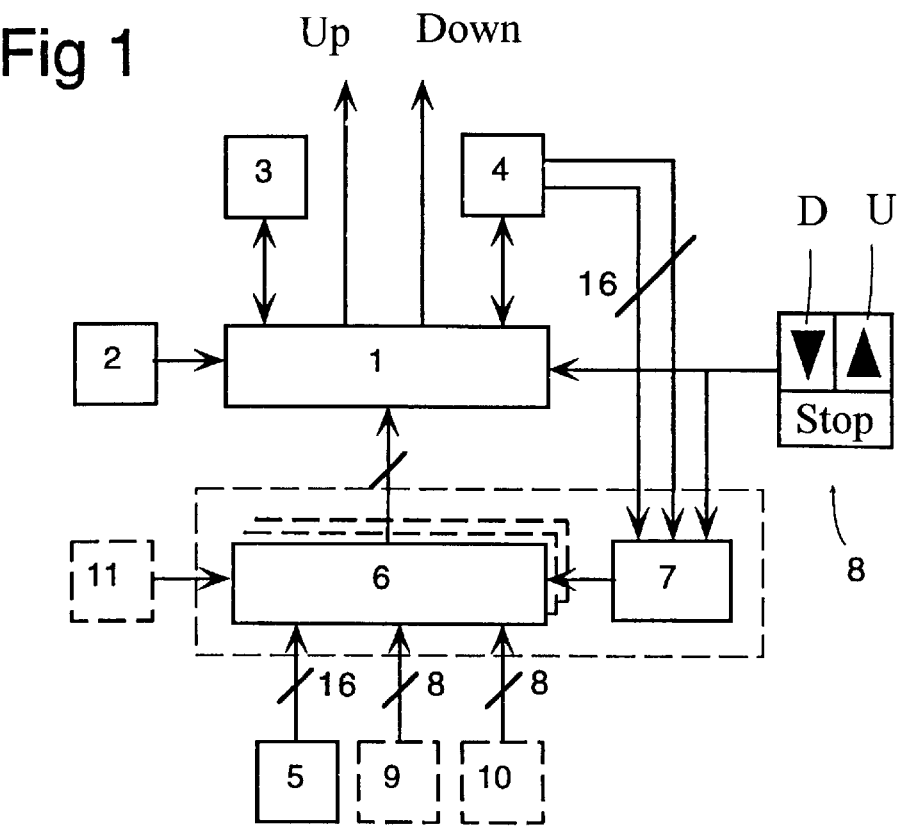
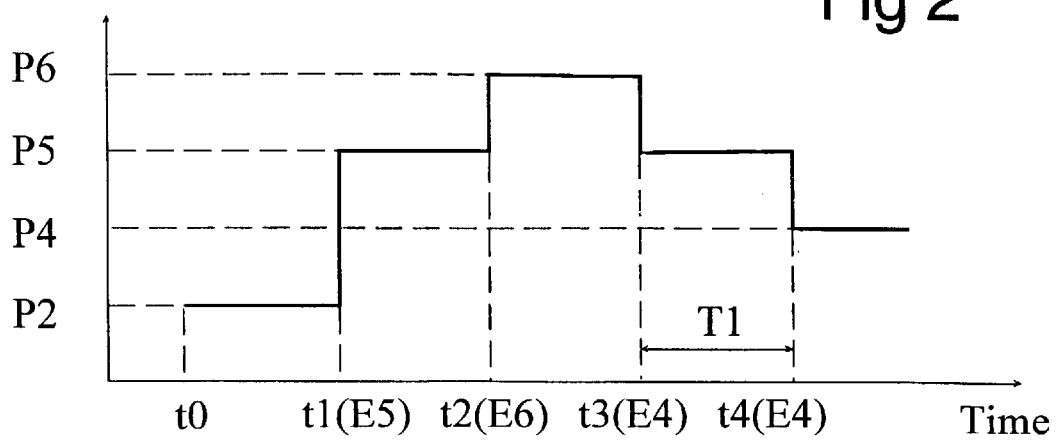

CONTROL DEVICE FOR A SOLAR PROTECTION MEANS

FIELD OF INVENTION

The present invention relates to a control device which provides a mobile means of protection against the suns rays, assuring the displacement of the solar protection means from a first position, among at least two predetermined positions, to a second position, according to the variation in the amount of sunshine.

PRIOR ART

Positioning devices are known which provide solar protection as a function of the amount of sunshine. The device according to document DE 30 39 644 changes the orientation of blades of a venetian blind as a function of the height of the sun above the horizon. In document WO 92/00557, a device is shown which enables the automatic positioning of a blind as a function of illumination and temperature.

In order to avoid untimely movement of the solar protection means for brief variations in the intensity of sunshine, variations due, for example, to the passage of clouds, the control devices are equipped with a tempering means such that such variations in the amount of sunshine do not affect the solar protection means. For the user, the control device reacts with a certain delay. According to the user, the delay may be considered either as insufficient, the user considering, in the second case, that the displacement of the solar protection means is still untimely. The control device shall not be therefore satisfactory for all users.

SUMMARY OF THE INVENTION

The present invention has as a principal goal the creation of a control device capable of adapting itself to the user, particularly to the user's behavior.

To that end, the control device according to the invention is characterized in that it comprises a logic which breaks down the movement from the first to the second position into at least two steps separated by an interval of time and is capable of fractional modification of this interval, and includes a means by which activation during said interval activates the following step and reduces said interval by a fraction and of which the activation after said interval and during the progress of the following step, increases such interval by a fraction.

Said means may constitute, for example, a stop key "STOP" in a manual control box of the solar protection means.

This means, optionally comprising an assembly of keys of the manual control box, gives a control order to rise or to descend during such interval having the effect of reducing the interval, while the activation of the stop key after such interval and during the progression of the following step having the effect of increasing the interval. One such embodiment corresponds to the general attitude adopted by the user who would like to manually position a sliding shutter or a venetian blind if the automation reacts too slowly.

According to an embodiment of such invention, the logic is designed, and respectively programmed, in such a way that the movement is controlled by at least two steps only when the variation of the intensity in the sunshine produces an inverse sense as the monotone variation due to the singular course of the sun. In the case of a modification of sunshine due to the singular course of the sun, it is not, in effect, generally necessary to modify the speed of the adaptation, in stages, of the position of the solar protection means. On the contrary, when there is a modification of the amount of sunshine in an inverse sense, that is to say, provoked for example by the passage of clouds, specifically by the appearance of a cloud in a cloudy sky, the user shall sense a change of position in the solar protection means.

In the preferred embodiment of the invention, in which the logic is comprised of a memory in which a staged positioning function of the solar protection means is stored as a function of the intensity in sunshine and comprising some voluntary control means essentially taking positioning priority over the solar protection means, the logic is capable of modifying in stages the function of the registered position in response to a manually introduced positioning order. The logic shall not respond in all cases to such order if the order is given outside of said interval. This permits the user to modify to his liking the positioning function. The voluntary control means shall be in general the control keys for raising and lowering the solar protection means.

According to an embodiment of the logic of the control device, the logic is comprised of a command interpreter for the powering of the motor, the command interpreter assuring the control of the position of the solar protection means in said interval and executing the manual positioning orders, a course interpreter having as a purpose learning the course of the step motor for each cycle of the raising-lowering operation and of delivering to the command interpreter the minimum-maximum position of the solar protection means, a position estimator tasked with calculating the assumed position of the solar protection means as a function of the different movement requests furnished by the command interpreter to the motor, between the minimum and maximum positions, and of communicating to the command interpreter the different levels of positions of the position function, at least one decision block which is associated with a solar panel, this decision block allowing as much the output positions that it has previewed of the positions in the positioning function, the said outputs being connected to the command interpreter, and an associated training block of the decision block, the training block being tasked with progressively modifying the position function each time that the user intervenes manually.

The device can among other things be eventually equipped with several decision blocks and a decision block selector, in that the time and date stamp means for the introduction of the date and the time in the decision block, the latter being in the case laid out in such a manner to modify the positioning function as a function of the amount of sunshine at the date and time, these variables being divided in portions determining a succession of discrete levels.

BRIEF DESCRIPTION OF THE DRAWINGS

The annexed drawing illustrates, by example, an embodiment of the device according to the invention.

FIG. 1 is a functional block-schematic of the control device comprising the training option.

FIG. 2 represents the diagram of a progressive example of the position of the solar protection means as a function of time.

DESCRIPTION OF THE PREFERRED EMBODIMENTS

The control device comprises, according to FIG. 1, the command interpreter 1, a course interpreter 2, a delay 3, an position estimator 4, a solar panel 5, a decision block 6, a training block 7, and a manual control box 8 comprising an ascent key M, a descent key D and a stop key STOP. As an option, the control device can equally comprise a time and date stamp device 9, 19, giving the date and the time, respectively.

The control device may be equipped with several decision blocks 6. In this case, a block selector 11 is foreseen.

The command interpreter 1 has as a principal purpose the transforming a new position P given by the training block 7, constituted, for example, of a neural network, a central processing unit or a fuzzy logic unit, into a directly executable order by the drive motor of the solar protection means. As a function of the estimated actual position, the command interpreter 1 powers the motor in the direction of desired functioning and for a predetermined time, in order to attain the new position P.

The control device 1 executes the manual position order given by the user by means of the ascent, descent and stop keys in the same manner.

The command interpreter 1 introduces and manages the delay T1, calling for delayed reaction of the system, which is intended to avoid too frequent changes of position of the solar protection means.

The command interpreter 1 receives of the course interpreter 2, among other things, the minimum position P1 and the maximum position P16 (for example) of the utilized solar protection means, these positions being furnished with the function time of the motor, in one sense or the other.

The command interpreter 1 informs the position estimator 4 of the quantity of movement that it is to give to each of its actions. The command interpreter also has therefore a position control function of the solar protection means.

The course interpreter 2 has as a purpose learning the course of the actuator of the solar protection means. At the first placement under tension, the control device puts the solar protection means through one complete function cycle (ascent and descent) which gives the two respective times corresponding to the course between P1 and P16 of the actuator. According to the following, each time that the solar protection means arrives at the end of the course, it recalculates its course. P1 and P16 correspond, respectively, to a sliding blind or a shutter, at the position of complete retraction and at the position of complete extension.

The position estimator 4 is tasked with calculating the assumed position of the solar protection means as a function of the different movement requests furnished by the command interpreter 1 to the motor in the interval P1–P16. It furnishes therefore 16 position levels estimated by the training block 7 and by the command interpreter 1.

The sun-intensity block 5 is constituted of a solar panel and an electronic measuring module. It determines the 16 levels of sun intensity E1 to E16 corresponding to the positions P1 to P16.

The training block 7 contains a retro-propogation algorithm activated upon each intervention of the user by means of the control box 8. That algorithm permits the modification of the logic of the decision block 6 by comparison of the output of the position estimator block with the position chosen by the user.

The decision block 6 comprises a logic comprising 16 positions of the output essentially corresponding to a non-linear position relation of output P as a function of the solar intensity E and if necessary as a function of the date and the time.

It is possible to foresee several decision blocks selectable by means of a block selector 11. These decision blocks would have a different logic corresponding to several possible moods of the user.

The decision block comprises therefore initially the function P=f(E). This function is the same which looks after the date and time, because one does not know at the departure the influence of the date and the time on the positions. The function P=f(E) may present a hysteresis effect on P corresponding to more or less a certain level of sunshine.

Described below is the functioning of the device.

The Initialization

From the time of the first power on, the solar protection means automatically determines first of all the course of its actuator between the two extreme open and closed positions, that is to say, the positions P1 and P16.

The solar protection means executes subsequently a positioning order conforming to the stored equation P=f(E) In general, it is important that the solar protection means shall be positioned much lower than the measured amount of sunshine.

Training

The function P=f(E) is modified progressively, as a function of the difference solar intensity levels E, and of the date and time, each time the user manually intervenes by means of the control box 8, the manual command always having the priority. Each manually controlled positioning is stored in so far as new value Pn is among the 16 values P1 to P16. The user can in this way establish and modify voluntarily the function P=f(E) as is convenient for him.

If the device comprises the option of date and time, the function becomes P=f(E, D, H).

Account taken of the necessity of breaking down the parts of time, the dates and the zones of acceptable luminary comfort for the user, the position function (P)=f(E) or the function P=F(E, D, H) always presents itself in the form for a step function.

Finally, to avoid the transitory corrections of position at the time of brief variations of sunshine, the measured level of sunshine must remain stable a minimum of time before being taken in account by the device and in particular by the decision block. In this way, the given sun intensity is filtered and stalled or temporized in the sun intensity detector 5.

Supposing for example that the device detects a variation in solar intensity Δ E, giving E5, corresponding to the passage of an actual position P2 to a new position P5, it immediately gives the order to reach the position P5 (FIG. 2). The direction of this variation of solar intensity Δ E is memorized.

When the device detects a new variation of solar intensity Δ E, in the same direction of the preceding variation, giving E6, the device immediately gives the order to attain the corresponding position P6 and so on and so forth.

If on the other hand the variation Δ E is in the opposite direction to the preceding variation and gives, for example, the solar intensity value E4 corresponding to a position P4, then the device gives the order to attain momentarily an intermediate position P6 and P4, that is to say P5 or, if there is not an intermediate position then halfway between the two positions, the median position, which is closest to the final position, during the interval of time T1. At the end of the interval T1 and if the conditions remain stable, the device gives the order to attain the position P4.

If, during the interval T1, the user gives a positioning order by means of the control box 8, the command interpreter 1 that directly received the order, assigns a reduced value to the interval T1. The reduction is for example equal to half of the measured difference between the reaction time of the user and T1.

It can at all times (be) that the user thinks that the device reacts too rapidly, that is to say, that the interval T1 is too short. In this case, it is possible to lengthen the interval, in a particular case to double the value T1, by pushing the corresponding key. One shall use, according to preference, the stop key STOP. The effect will not be obtained nevertheless if the key STOP is activated before the solar protection means would have attained its new position.

On the outside of the interval of time T1, all positioning orders given manually by means of the control box 8 would have been considered by the control device as a new position value Pn of the function P=f(E).

To lengthen the interval of time T1, it would be possible to foresee a special key at the control box.

In a simplified execution, it is possible to bypass the training function and as a consequence, the training block 7.

What is claimed is:

1. A control device for a motorized solar protection means, to allow the movement of the solar protection means from a first position towards a second position to suit a variation in sunshine, wherein the control device comprises:

logic (6) for breaking down the movement from the first and the second position into at least two steps separated by a time interval (T1) said logic capable of modifying a fraction of the time interval (T1), and a stopping means (STOP), which if actuated during said time interval (T1) activates a following step and reduces the said interval by a fraction, and which if actuated after the said time interval and during the operation of the following step increases the said time interval by a fraction.

2. The device according to claim 1, wherein the logic (6) provides that movement in at least two steps is ordered only when the variation in intensity of the sun is different than a monotone variation due to the course of the sun.

3. A control device for a motorized solar protection means, to allow the movement of the solar protection means from a first position, towards a second position to suit a variation in sunshine, wherein the control device comprises:

logic for breaking down the movement from the first and the second position into at least two steps separated by a time interval (T1), and capable of modifying a fraction of the time interval (T1), and the logic includes a memory storing in stages a positioning function of a solar protection means as a function of the intensity of sunshine and including a voluntary control means (8) having positioning priority in the solar protection means, wherein the logic is capable of modifying the positioning function in stages in response to a positioning order introduced by said voluntary control means, the logic not responding in all cases to such order if the order is given outside said time interval (T1), and a stopping means (STOP), which inactivated during said interval (T1) activates a following step and reduces the said interval by a fraction and if activated after the said interval and during the operation of the following step, increases the said interval by a fraction.

4. The device according to claim 3, wherein the voluntary control means are control keys for activating an ascent-descent function of the solar protection means.

5. The device according to claim 4, wherein the logic comprises a command interpreter (1) for powering a motor, the command interpreter monitoring the positions of the solar protection means and the said time interval (T1) and executing manual positioning orders, a course interpreter (2) for learning the course of a step actuator for each cycle of an ascent-descent function and delivering to the command interpreter the minimum and maximum position of the solar protection means, a position estimator (4) for calculating the assumed position of different movement requests furnished to the motor by the command interpreter, between the minimum position (P1) and the maximum position (P16), and of communicating to the command interpreter different estimated positions of the positioning function, at least one decision block (6) which is associated with a solar panel (5), the decision block also allowing output positions, each having an associated output, said outputs being connected to the command interpreter, and a training block (7) associated with the decision block, the training block providing progressive modification of the positioning function each time that the user manually intervenes.

6. The device according to claim 5, wherein the device further includes a date and time recording means (9, 10) for the introduction or date and time information in the decision block, said decision block is designed in such a manner to modify the positioning function as a function of the amount of sunshine and the date and time, the amount of sunshine and the date and time being divided in predetermined portions into a series of discrete levels.

7. The device according to claim 5, wherein the device further includes several decision blocks and a decision block selector (1).

8. The device according to claim 7, wherein the device further includes a date and time recording means (9, 10) for the introduction of date and time information in the decision block, said decision block adapted to modify the positioning function as a function of the amount of sunshine and the date and time, the amount of sunshine and date and time being divided in predetermined portions into a series of discrete levels.

9. The device according to claim 1, wherein the stop means is activated by a stop control key (STOP) of the solar protection means.

* * * * *